(12) United States Patent
Snider et al.

(10) Patent No.: US 8,555,653 B2
(45) Date of Patent: Oct. 15, 2013

(54) METHOD FOR STARTING A TURBOMACHINE

(75) Inventors: David A. Snider, Simpsonville, SC (US); William F. Seely, Taylors, SC (US); John C. Maters, Liberty, SC (US); Eugene A. Post, Glenville, NY (US); Samuel B. Shartzer, Greenville, SC (US)

(73) Assignee: General Electric Company, Schenectady, NY (US)

( * ) Notice: Subject to any disclaimer, the term of this patent is extended or adjusted under 35 U.S.C. 154(b) by 965 days.

(21) Appl. No.: 12/646,045

(22) Filed: Dec. 23, 2009

(65) Prior Publication Data
US 2011/0146291 A1    Jun. 23, 2011

(51) Int. Cl.
*F02C 7/22* (2006.01)
*F02C 7/26* (2006.01)

(52) U.S. Cl.
USPC .................................. 60/778; 60/773; 60/786

(58) Field of Classification Search
USPC ................ 60/772, 773, 778, 786, 787, 788
See application file for complete search history.

(56) References Cited

U.S. PATENT DOCUMENTS

| | | | |
|---|---|---|---|
| 3,520,133 A * | 7/1970 | Loft et al. ........................ 60/790 |
| 3,638,422 A * | 2/1972 | Loft et al. ................. 60/39.281 |
| 3,639,076 A * | 2/1972 | Rowen ............................ 416/30 |
| 4,015,430 A | 4/1977 | Braytenbah et al. |
| 4,204,258 A | 5/1980 | Zitelli et al. |
| 4,423,593 A | 1/1984 | Zagranski et al. |
| 4,490,791 A * | 12/1984 | Morrison ....................... 701/100 |
| 5,252,860 A * | 10/1993 | McCarty et al. ............ 290/40 R |
| 5,732,546 A * | 3/1998 | Pineo et al. ..................... 60/773 |
| 5,783,932 A * | 7/1998 | Namba et al. .................... 322/16 |
| 6,164,057 A * | 12/2000 | Rowen et al. ................. 60/39.27 |
| 7,915,868 B1 * | 3/2011 | Maters et al. .................... 322/29 |
| 8,321,120 B2 * | 11/2012 | Riley ............................. 701/100 |
| 2004/0200207 A1 * | 10/2004 | McKelvey et al. ......... 60/39.281 |
| 2006/0233637 A1 | 10/2006 | Yakushi et al. |
| 2011/0179802 A1 * | 7/2011 | Snider et al. ..................... 60/778 |
| 2012/0017602 A1 * | 1/2012 | Hansen et al. .................. 60/778 |

FOREIGN PATENT DOCUMENTS

| | | |
|---|---|---|
| DE | 3375181 | 2/1988 |
| EP | 92426 A1 | 10/1983 |
| EP | 92426 B1 | 1/1988 |

\* cited by examiner

*Primary Examiner* — William H Rodriguez
(74) *Attorney, Agent, or Firm* — Ernest G. Cusick; Frank A. Landgraff (57) ABSTRACT

Embodiments of the present invention employ a closed loop controls philosophy, which actively controls the starting means of a powerplant machine, throughout the start-up process. Here, the present invention may provide a method for adjusting a nominal operating schedule of the starting means, which may have the form of a Load Commutated Inverter (LCI). Embodiments of the method may adjust the nominal operating schedule based, in part, on an operating parameter, which is associated with the gas turbine 100. The operating parameter may include, but is not limited to: a rotor speed, a desired start-up time, or the like. Here, the control system may receive data on the operating parameter associated with the gas turbine.

11 Claims, 4 Drawing Sheets

FIG. 1

PRIOR ART

FIG. 2

PRIOR ART

FIG. 3

PRIOR ART

METHOD FOR STARTING A TURBOMACHINE

BACKGROUND OF THE INVENTION

This application is related to commonly-assigned U.S. patent application Ser. No. 12/331,824, filed Dec. 10, 2008.

The present invention relates generally to the operation of a turbomachine, and more particularly, to a method of reducing the variation associated with the start-up time of the turbomachine.

"Fast Start" may be considered an operating mode requiring a turbomachine to export a load, capable of emissions complaint operation, within a certain time after an operator initiates a start of that turbomachine. Fluctuating energy demand is a major factor in determining when the turbomachine operates. Turbomachines are commonly idled until sufficient demand requires operation. When demand requires operation, the turbomachine performs a start-up process before exporting the desired energy (electricity, mechanical torque, steam, and the like).

The start-up process of some known turbomachines, such as, but not limiting of, a combustion gas turbine, typically involves a plurality modes occurring at different operating speeds. These modes include, but are not limited to: a purge, an ignition, a warm-up, and acceleration to an operating speed. The start-up time ranges from the initiation of a start to when the gas turbine reaches the operating speed.

During the startup process there are two sources of torque available to accelerate a rotor of the gas turbine. Energy released during the ignition process, and the torque applied to the rotor via from the starting means. The energy released during the ignition process is converted to mechanical torque, which drives the rotor. However, at lower speeds this torque is insufficient to drive the rotor to the operating speed, resulting in a negative torque, or drag, on the gas turbine. At higher speeds the mechanical torque contributed by the ignition process provide very large torque inputs. Here, the gas turbine become self-sustaining as the speed of the rotor nears the operating speed, no longer requiring torque from the starting means.

Typically, there can be wide variations in the start-up time. These variations are typically caused by a change in an operating parameter, which may require an adjustment to a fuel stroke reference (FSR) or the like, in order to accelerate the gas turbine to the operating speed. Here, FSR is adjusted because the starting means operates on a fixed schedule. Essentially, this fixed schedule provides higher torque at lower rotor speeds. The torque decreases as the rotor speed increases.

There are a few issues with the current start-up process. In some applications, variations in the start-up time may be unacceptable. Here, due to the variation in the start-up time, the gas turbine may not meet operational requirements.

Therefore, there is a desire for an improved method of starting a gas turbine. The method may reduce the variations in start-up times associated with the accelerating the gas turbine to an operating speed. The method should apply the gas turbine is operating in either: a Normal Mode, a Fast Start Mode, or the like. This method should also provide a more consistent and repeatable start-up times.

BRIEF DESCRIPTION OF THE INVENTION

In an embodiment of the present invention, a method of actively controlling a starting system during a starting process of the powerplant machine, the method comprising: determining a target range for a parameter, wherein the parameter is associated with an operation of a powerplant machine; determining a measured value of the parameter; determining a parameter difference, wherein the parameter difference is a difference between the target range and the measured value; and adjusting an operating schedule of the starting system based on the parameter difference; wherein the method adjusts an output of the starting system the parameter difference; and wherein the output contributes to the acceleration of the powerplant machine during a start-up process.

In an alternate embodiment of the present invention, a method of actively controlling a Load Commutated Inverter (LCI) during a starting process of the gas turbine, the method comprising: determining a target range for a parameter, wherein the parameter is associated with an operation of a gas turbine; determining a measured value of the parameter; determining a parameter difference, wherein the parameter difference is a difference between the target range and the measured value; and adjusting an operating schedule of the LCI based on the parameter difference; wherein the method continuously adjusts an output of the LCI based on the parameter difference during a start-up process of the gas turbine; and wherein the output contributes to the acceleration of the gas turbine.

In an another alternate embodiment of the present invention, a system for actively controlling a Load Commutated Inverter (LCI) during a starting process of the gas turbine, the system comprising: a gas turbine integrated with an LCI; and a control system configured for performing the steps of: determining a target range for a parameter, wherein the parameter is associated with an operation of the gas turbine; determining a measured value of the parameter; determining a parameter difference, wherein the parameter difference is a difference between the target range and the measured value; and adjusting an operating schedule of the LCI based on the parameter difference; wherein the control system continuously monitors and adjusts an output of the LCI based on the parameter difference; wherein the output contributes to the acceleration of the gas turbine during a start-up process.

DETAILED DESCRIPTION OF THE INVENTION

The present invention has the technical effect of reducing the variation associated with the start-up time of a powerplant machine. Embodiments of the present invention may actively control the starting system of a powerplant machine with the goal of reducing variations in the starting time. Embodiments of the present invention may be applied to a powerplant machine operating in a variety of modes, such as, but not limiting of: a Normal Mode, a Fast Start Mode, or the like.

As discussed, "Fast Start" may be considered an operating mode of a powerplant machine. This mode generally requires the powerplant machine to export a load, while operating in emissions compliance, within a certain time after a start of that powerplant machine is initiated. As used herein, the term Fast Start is intended to include all such modes and equivalents thereof within the scope of this invention.

An embodiment of the present invention provides a method of starting a powerplant machine, such as, but not limiting of, a gas turbine set to operate in a Fast Start mode. The gas turbine may include, but is not limited to, a heavy-duty gas turbine, an aero-derivative gas turbine, and the like. Although embodiments of the present methodology are described in relation to a gas turbine, application of the present invention is not limited to a gas turbine. Embodiments of the present invention may be applied to other industrial machines that may require a starting system during a portion of a start-up process.

Detailed example embodiments are disclosed herein. However, specific structural and functional details disclosed herein are merely representative for purposes of describing example embodiments. Example embodiments may, however, be embodied in many alternate forms, and should not be construed as limited to only the embodiments set forth herein.

Accordingly, while example embodiments are capable of various modifications and alternative forms, embodiments thereof are illustrated by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any, and all, combinations of one or more of the associated listed items.

The terminology used herein is for describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted might occur out of the order noted in the FIGS. Two successive FIGS., for example, may be executed substantially concurrently or may sometimes be executed in the reverse order, depending upon the functionality/operations involved.

Figure 1:
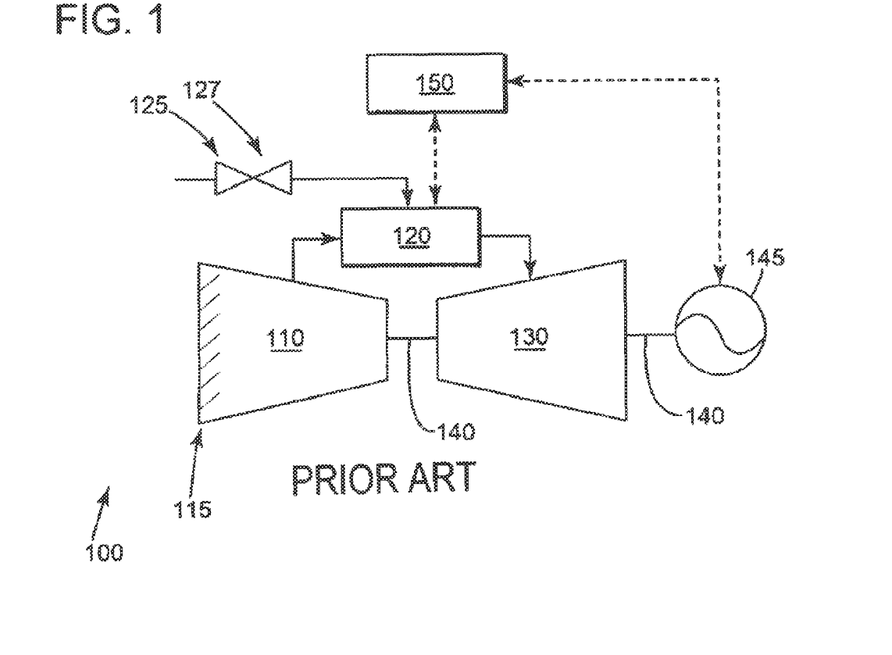
FIG. 1 is a schematic illustrating an environment within which a known method of starting a turbomachine operates.

Referring now to the FIGS., where the various numbers represent like parts throughout the several views. Moreover, in the FIGS., lines connecting various elements represent intercommunication between the respective elements and are not labeled for ease of illustration and understanding of the instant invention. FIG. 1 is a schematic illustrating an environment within which a known method of starting a turbomachine operates. In FIG. 1, a turbomachine 100, in the form of a gas turbine, includes: a compressor section 110; a combustion system 120; a fuel supply system 125; a turbine section 130; a rotor 140; and a turbine control system 150. The combustion system 120 may receive a fuel from a fuel circuit 127 of the fuel system 125. Embodiments of the fuel system 125 may comprise multiple fuel circuits 127. Here, the multiple fuel circuits may include at least one of: a gas fuel circuit; a liquid fuel circuit; or an IGCC circuit, which is configured for delivering a mixed or synthetic gas fuel. Embodiments of the present invention may be applied to a gas turbine 100 with a fuel system 125 comprising either single or multiple fuel circuits 127.

Generally, the compressor section 110 includes a plurality of inlet guide vanes (IGVs) 115 and a plurality of rotating blades and stationary vanes structured to compress an ingested air, illustrated by the large arrow in FIG. 1. Within the combustion system 120, the compressed air and fuel are mixed, ignited, and create a working fluid.

The working fluid generally proceeds downstream from the combustion system 120 to the turbine section 130. The turbine section 130 includes a plurality of rotating and stationary components (neither of which are illustrated). These components may be positioned about a rotor 140 and function to convert the working fluid to a mechanical torque, which may be used to drive the compressor section 110 and the load 145 integrated with the gas turbine 100 via the rotor 140.

Operationally, known methods of starting-up the gas turbine 100 involve the following steps. The starting means 155, such as, but not limiting of, a Load Commutated Inverter (LCI) accelerates the gas turbine 100 to a predefined purge speed. The starting means 155 typically operates on a fixed and predefined schedule. The purge speed is maintained until a predefined timer is complete. This timer serves to ensure that sufficient airflow passes through an exhaust system (not illustrated), after which the purging process is complete.

After the purge is complete, the starting means 155 decelerates the gas turbine 100 to a predefined ignition speed. At this ignition speed, valves of the combustion system 120 and the fuel circuit 127 are modulated to a predefined position for ignition fuel flow, controlled under an open loop fuel flow philosophy. After ignition and a pre-defined warm-up timer expires, the starting means 155 and the control system 150 cooperatively accelerate the gas turbine 100 to a primary operating speed, such as, but not limiting of, FSNL. The fixed schedule of the starting means 155 does not account for changes in operating parameters, such as, but not limiting of, performance, inlet conditions, and other operating variables. Here, the control system 150 may be required compensate by adjusting the FSR of the gas turbine 100, leading to variations in the start-up time and in the temperature, such as, but not limiting of, the firing or exhaust, of the turbomachine.

Figure 2:
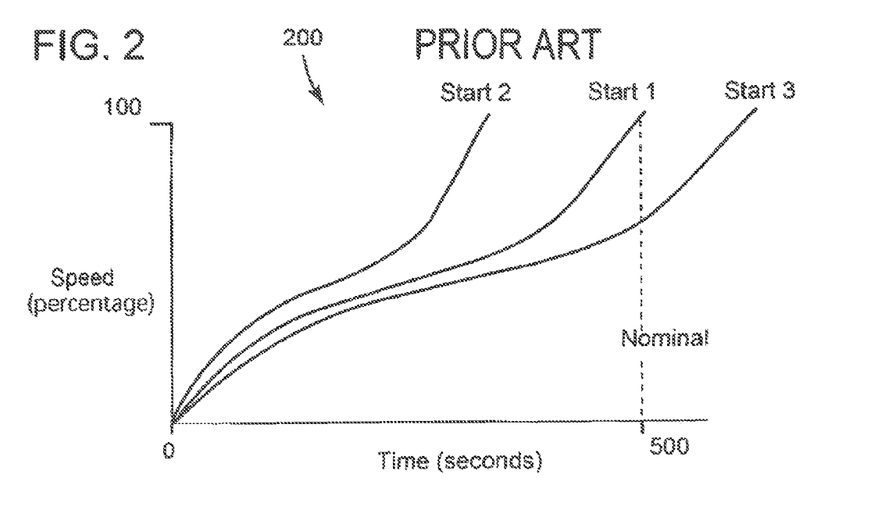
FIG. 2 is a chart illustrating acceleration curves in accordance with the known starting method of FIG. 1.

FIG. 2 is a chart illustrating acceleration curves in accordance with the known starting method of FIG. 1. FIG. 2 illustrates the speed of the rotor (in percent) versus the start-up time (in seconds). Here, 100% speed indicates that the gas turbine 100 has reached a primary operating speed. FIG. 2 also illustrates the variation that may occur during multiple start-ups, of the same gas turbine 100. Here, the variations in speed illustrate the impact of changes in operating parameters on the start-up process of the gas turbine 100. Start 1, may be considered a desired or nominal start-up. Start 2, may be considered a rapid start-up since the overall time is significantly less than the nominal time, possibly due to the over-firing of the gas turbine 100. Start 3, may be considered a slow start-up since the overall time is considerably more than the nominal time, possibly due to the under-firing of the gas turbine 100. As discussed, the over-firing or the under-firing of the gas turbine 100 may result from the variation in the operating parameter(s).

Figure 3:
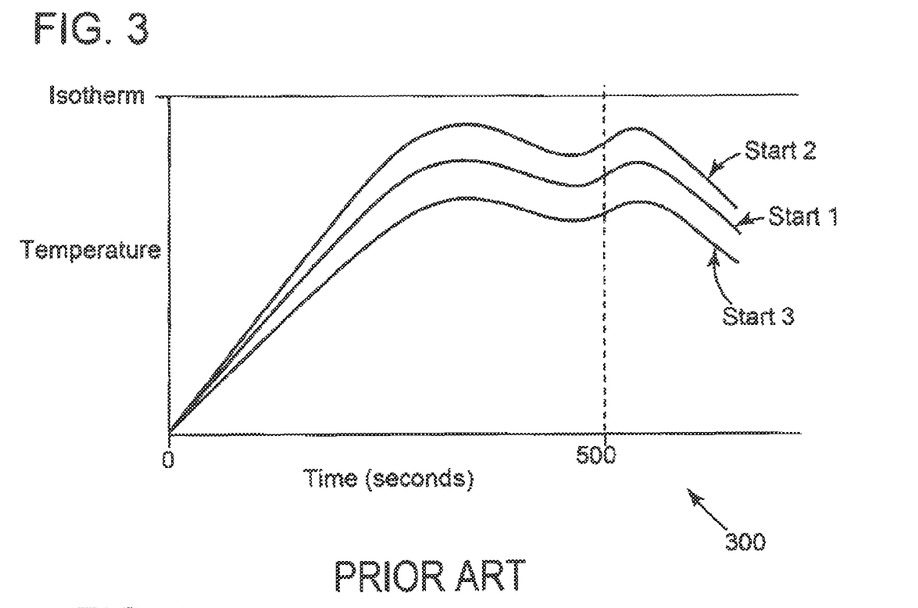
FIG. 3 is a chart illustrating temperatures curves in accordance with the known starting method of FIG. 1.

FIG. 3 is a chart illustrating temperatures curves in accordance with the known starting method of FIG. 1. FIG. 3 illustrates a temperature of the gas turbine 100 versus the start-up time (in seconds). This temperature may be, for example, but not limiting of, a firing temperature, a universal reference temperature, an exhaust temperature, or the like. The isotherm represents a maximum temperature that the gas turbine 100 may be allowed to reach for physical and/or thermodynamic reasons. FIG. 3 also illustrates the variation that may occur during multiple start-ups, of the same gas turbine 100. Here, the variations in temperature illustrate the impact of changes in operating parameters on the start-up process of the gas turbine 100. Start 1, may be considered a desired or nominal start-up. Start 2, may be considered an over-fired start-up since the temperature is considerably higher than the Start 1, which is consider the nominal start-up of the gas turbine 100. Start 3, may be considered an under-fired start-up since the temperature is considerably lower than the Start 1, possibly due to the under-firing of the gas turbine 100.

As will be appreciated, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects all generally referred to herein as a "circuit", "module," or "system". Furthermore, the present invention may take the form of a computer program product on a computer-usable storage medium having computer-usable program code embodied in the medium. As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are exemplary only, and are thus not limiting as to the types of memory usable for storage of a computer program.

Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

Computer program code for carrying out operations of the present invention may be written in an object oriented programming language such as Java7, Smalltalk or C++, or the like. However, the computer program code for carrying out operations of the present invention may also be written in conventional procedural programming languages, such as the "C" programming language, or a similar language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatuses (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a public purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory. These instructions can direct a computer or other programmable data processing apparatus to function in a particular manner. The such that the instructions stored in the computer-readable memory produce an article of manufacture including instruction means which implement the function/act specified in the flowchart and/or block diagram block or blocks. The computer program instructions may also be loaded onto a computer or other programmable data processing apparatus. These instructions may cause a series of operational steps to be performed on the computer or other programmable apparatus to produce a computer implemented process. Here, the instructions, which execute on the computer or other programmable apparatus, provide steps for implementing the functions/acts specified in the flowchart and/or block diagram blocks.

Figure 4:
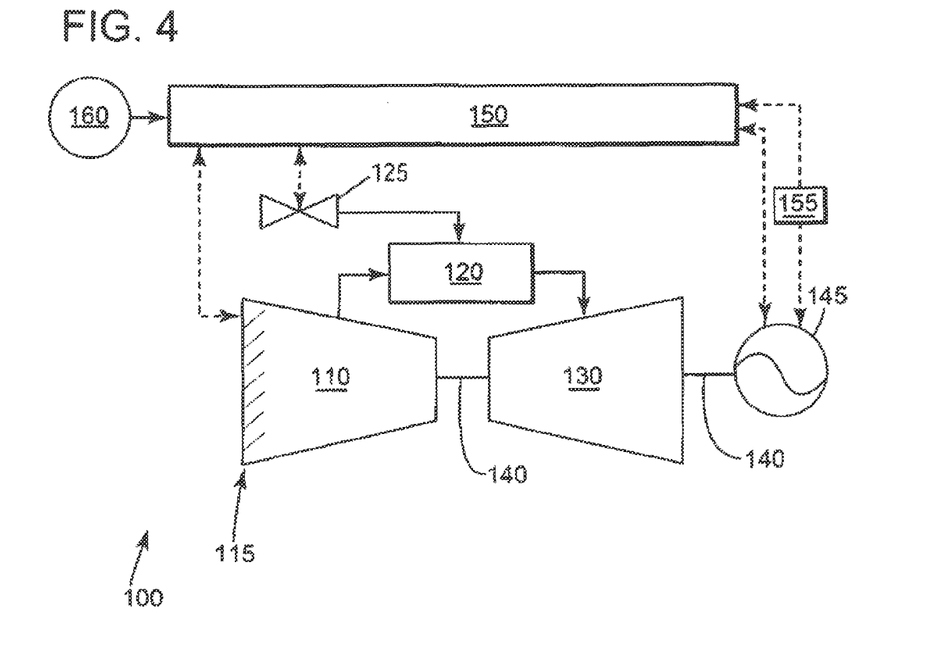
FIG. 4 is a schematic illustrating an environment within which an embodiment of the present invention may operate.

Referring again to the Figures, FIG. 4 is a schematic illustrating an environment within which an embodiment of the present invention may operate. The majority of the components of the gas turbine 100 discussed with FIG. 1, are the same in FIG. 2. The discussion of FIG. 4 focuses on an embodiment of the present invention applied to the gas turbine 100. An embodiment of the present invention may provide a modified control system 150.

Embodiments of the present invention employ a closed loop controls philosophy, which actively controls the starting means 155 of the gas turbine 100, throughout the start-up process. The control system 150 may be configured with algorithms that apply an embodiment of a method of the present invention to the gas turbine 100. Here, the present invention provides a method for adjusting a nominal operating schedule of the starting means 155, which may have the form of a Load Commutated Inverter (LCI) 155. Embodiments of the method may adjust the nominal operating schedule based, in part, on an operating parameter 160, which is associated with the gas turbine 100. As discussed below, the operating parameter may include, but is not limited to: a rotor speed, a desired start-up time, or the like. Here, the control system 150 may receive data on the operating parameter 160 associated with the gas turbine 100.

The operating parameter 160 generally includes parameters that may directly, or indirectly, impact the gas turbine 100 during the start-up process. These operating parameters 160 may include, but are not limited to: an exhaust temperature, a firing temperature, a combustion reference temperature, ambient conditions, rotor speed, rotor acceleration, and a physical property of the gas turbine 100. The ambient conditions may include, but are not limited to: temperature, humidity, and barometric pressure. The physical property or characteristic of the gas turbine 100 may include, but is not limited to: fouling of the compressor section 110, cleanliness of an inlet system (not illustrated), accuracy/calibration of components of the fuel system 125, combustion system 120 or the IGVs 115.

The closed loop controls philosophy of embodiments of the present invention actively determines the difference between a target value (or range) of the operating parameter and the measured, or real-time, value of the operating parameter. This difference is used to adjust the nominal operating schedule of the LCI 155.

This philosophy may provide many benefits, such as, but not limiting of, reducing, or eliminating the occurrences of under-firing or over-firing. This may also reduce the overall start-up time of the gas turbine 100. Furthermore, by actively controlling the LCI 155 during the start-up processes, the gas turbine 100 may perform a nearly optimal and repeatable start-up process. Additional benefits may reduce thermal transients and extend parts life. An embodiment of the method of the present invention employed by the control system 150 is discussed in further detail below in relation to FIG. 5.

Figure 5:
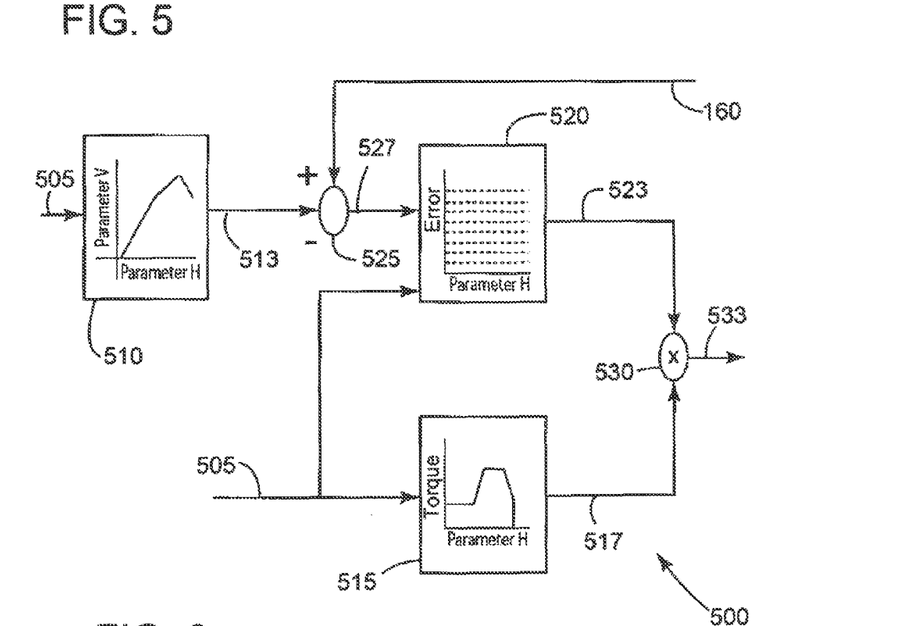
FIG. 5 is a process diagram illustrating algorithms of a method used to start-up a turbomachine, in accordance with an embodiment of the present invention.

FIG. 5 is a process diagram illustrating algorithms of a method 500 of actively controlling a system, in accordance with an embodiment of the present invention.

The control system configured with the method 500 may provide a graphical user interface (GUI), allowing an operator to navigate the steps discussed below. An embodiment of the present invention may determine, in real time, the adjustment necessary to the nominal operating schedule of the LCI 155. As discussed below, algorithms used in steps 510 and 515 may comprise the form of a multi-dimensional look-up table, physics based model, or the like. This may allow for an accurate determination of the impact multiple parameters on the start-up process.

Essentially, an embodiment of the method 500 may adjust the operation of the LCI 155 in order to meet a desired parameter. The parameter may have the form of, for example, but not limiting of, time, speed, or temperature. If the parameter is time, then an operator may desire that the start-up of the gas turbine 100 be completed in specific time. Here, the method 500 may determine how the nominal operating schedule of the LCI 155 should be adjusted to complete the start-up process in that specific time.

In block 510, the method 500 may employ a parameter target schedule block to determine a target value of a parameter. Here, the look-up table may comprise independent variables, Parameter H and Parameter V. Parameters H, V may comprise the form of speed, time, or the like. Block 510 may receive an input parameter 505. Next, block 510 may determine the parameter target 513, based on Parameter H, V, and other inputs into the look-up table.

The following non-limiting example provides a practical example of the how block 510 may function in use. The following non-limiting example may be used in discussion of other elements of the method 500, as described below. An operator may desire that the start-up process of the gas turbine 100 be completed within a specific time. Here, the input parameter 505 is time. Parameter H may also become time, while Parameter V may be rotor speed. Other inputs to block 510 may be ambient conditions and the fouling of the compressor section 110. As illustrated, the output of the block 510, parameter target 513, may be the rotor acceleration necessary to accelerate the rotor 140 to FSNL in the desired time.

In block 525, of the method 500, a junction may determine the difference between the values of the parameter target 513 and the measured parameter 160. After receiving the measured parameter 160, the summing junction may output the generate difference, as an error signal 527, or the like. Although, junction 525 is illustrated as an adder block in FIG. 5, the present invention is not limited to using an adder as the junction in block 525. Other embodiments of the method 500 may incorporate other engines, such as, but not limiting of, a scaler, multiplier, or the like for determining the difference between the parameter target 513 and the measured parameter 160.

Continuing with the non-limiting example associated with block 510, the parameter target 513 may be the target value of the rotor acceleration rate. The measured parameter 160 may be the current value of the rotor acceleration rate. The error signal 527 may, therefore, represent the difference in the values of 513 and 160.

The measured parameter 160 may derive from operating data of the gas turbine 100. This operating data may be considered other parameters of which a user may select as the input parameter 505. The operating data may relate to: the physical properties of the air ingested by the compressor section 110, the physical characteristics of the compressor section 110, the physical properties of the fuel, and the physical characteristics of the fuel supply system 125, and the current operating parameters of the gas turbine 100. The physical properties of the air may include, but are not limited to: the temperature, pressure, the humidity, and other ambient conditions. The physical characteristics of the compressor 110 may provide data on the cleanliness and fouling of the compressor. These physical characteristics may include, but are not limited to, a flowrate, pressure, differential pressure, and the like. The physical properties of the fuel may include, but are not limited to, the heating value of the fuel, the specific gravity, temperature, Wobbie Index, and the like. The physical characteristics of the fuel supply system 125 may relate to the accuracy of the components of the fuel supply system 125. This data may include, but is not limited to, the difference between a valve reference and feedback, pressure, flowrate, and the like. The current operating parameters of the gas turbine 100 may include, but is not limited to, the speed and acceleration of the turbomachine.

In block 520, the method 500 may employ a starting means adjustment block. Block 520 may have the form of look-up table, physics based model, or the like, to determine the required adjustment to necessary for the gas turbine 100 to satisfy the target parameter. As illustrated, the look-up table, or the like, may receive the input parameter 505 and the error signal 527. Here, the input parameter 505 may be the parameter H within the block 520. Next, block 520 may generate a starting means adjustment command 523 based on the error signal 527 and the input parameter 505. The command 523 may be considered the adjustment that may be made to the nominal operating schedule of the LCI 155.

Continuing with the non-limiting example associated with previous blocks, the error signal 527 may represent the adjustment to the rotor acceleration that may be needed for the rotor 140 may achieve FSNL in the specified time. Block 520 may transform the error signal, which is based on the acceleration rate, to a value based on the LCI operating schedule.

In block 515, the method 500 may employ a LCI nominal schedule block to determine a current command for the LCI. Here, the look-up table may comprise independent variables, Starting Mean Torque and Parameter H. Parameters H may comprise the form of speed, time, or the like. Block 515 may receive the input parameter 505. Next, block 515 may determine the starting means command target 517, based on the Torque, Parameter H, and other inputs into the look-up table.

Continuing with the non-limiting example associated with previous blocks, the starting means command target 517 may represent the nominal value of the torque command based on the desired start-up time. Block 515 may transform the input parameter 505, which is here start-up time, into a torque based starting means command 517. Here, the starting means command may be based on the nominal LCI operating schedule.

In step 530, the method 500 may determine the starting means request 533 necessary to accelerate the gas turbine 100 in a manner allowing for meeting the requirements of the input parameter 505. Here, a junction 530, or the like, may use the starting means adjustment command 523, generated in step 520, to adjust the starting means command 517, generated in step 515. This may essentially have the effect of adjusting the nominal operating schedule of the starting means 155, in real-time.

Although, the junction 530 is illustrated as a scaler block in FIG. 5, the present invention is not limited to using a scaler as the junction in block 530. Other embodiments of the method 500 incorporating other engines, such as, but not limiting of, a scaler, multiplier, or the like, for combining the values of elements 517 and 523.

Continuing with the non-limiting example associated with previous blocks, the starting means request 533 may represent the torque command sent to the LCI 155 and is based on the desired start-up time. Here, the starting means request 533 may be considered an adjustment to the nominal LCI operating schedule. The starting means request 533 serves to reduce the previously described error signal 527.

Figure 6:
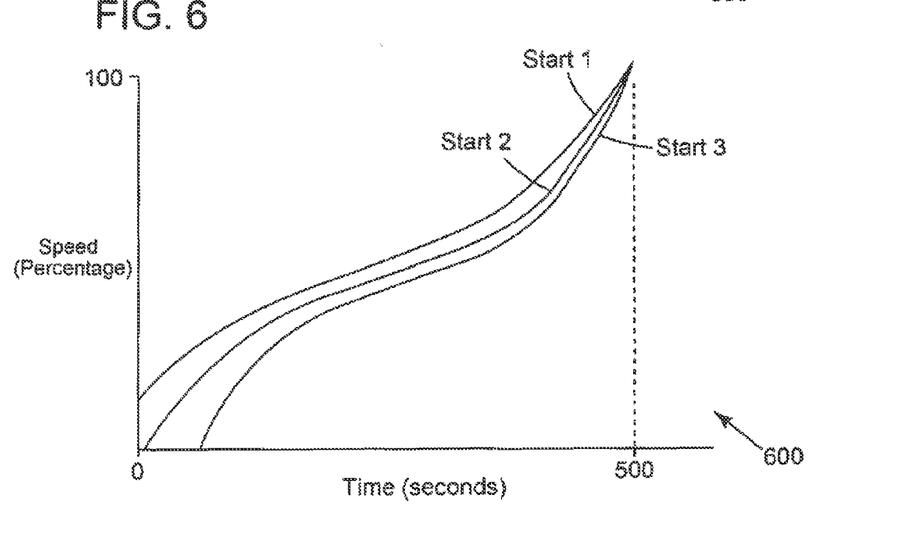
FIG. 6 is a chart illustrating acceleration curves in accordance with the method of FIG. 5, in accordance with an embodiment of the present invention.

FIG. 6 is a chart illustrating acceleration curves in accordance with the method 500 of FIG. 5, in accordance with an embodiment of the present invention. FIG. 6 illustrates the speed of the rotor in percent versus the start-up time in seconds. Here 100% speed indicates that the gas turbine 100 has reached the normal or primary operating speed. In comparison to FIG. 2, FIG. 6 illustrates a significant reduction in the variation that may occur during multiple start-ups, of the same gas turbine 100. Here, Start 1, 2, and 3 generally following the same trend with some difference in curvature. In addition, FIG. 6 illustrates that the start-up completion times of Start 1, 2, and 3 may have nearly the same duration. Embodiments of the present invention may significantly reduce over-firing and/or the under-firing of the gas turbine 100.

Figure 7:
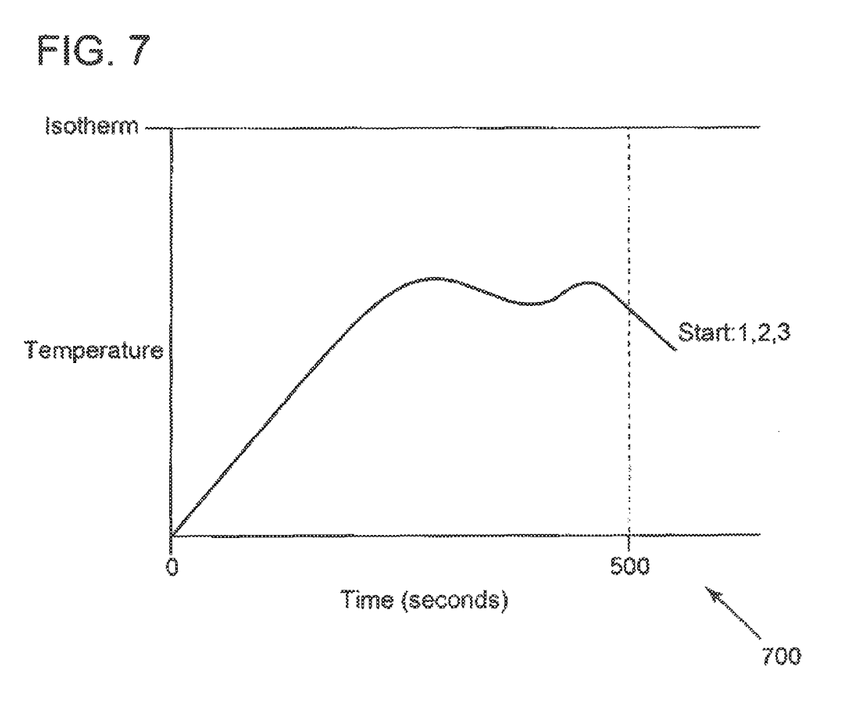
FIG. 7 is a chart illustrating temperatures curves in accordance with the method FIG. 5, in accordance with an embodiment of the present invention.

FIG. 7 is a chart illustrating temperatures curves in accordance with the method 500 of FIG. 5, in accordance with an embodiment of the present invention. FIG. 7 illustrates a temperature of the gas turbine 100 versus the start-up time in seconds. This temperature may be, for example, but not limiting of, a firing temperature, a universal reference temperature, an exhaust temperature, or the like. Here the isotherm represents a maximum temperature that the gas turbine 100 may be allowed to reaches for physical and/or thermodynamic reasons. In comparison to FIG. 3, FIG. 7 illustrates a significant reduction in the variation that may occur during multiple start-ups, of the same gas turbine 100. Here, the variations in temperature occurring during the start-up time, illustrated in FIG. 3, are substantially reduced. As discussed, embodiments of the present invention may significantly reduce over-firing and/or the under-firing of the gas turbine 100.

As discussed, embodiments of the present invention may substantially reduce the time required to start a turbomachine. Embodiments of the present invention may significantly reduce the variations in start-up times, because the starting means 155 operates under a closed-loop philosophy in conjunction with a real-time determination of the torque provided by the gas turbine 100.

As one of ordinary skill in the art will appreciate, the many varying features and configurations described above in relation to the several exemplary embodiments may be further selectively applied to form the other possible embodiments of the present invention. Those in the art will further understand that all possible iterations of the present invention are not provided or discussed in detail, even though all combinations and possible embodiments embraced by the several claims below or otherwise are intended to be part of the instant application. In addition, from the above description of several exemplary embodiments of the invention, those skilled in the art will perceive improvements, changes, and modifications. Such improvements, changes, and modifications within the skill of the art are also intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

What is claimed is:

1. A method of actively controlling a starting system during a starting process of the powerplant machine, the method comprising:

determining a target range for a parameter, wherein the parameter is associated with an operation of a powerplant machine;

determining a measured value of the parameter;

determining a parameter difference, wherein the parameter difference is a difference between the target range and the measured value; and adjusting an operating schedule of the starting system based on the parameter difference;

wherein the method adjusts an output of the starting system based on the parameter difference; and wherein the output contributes to the acceleration of the powerplant machine during a start-up process, wherein the powerplant machine comprises a turbomachine comprising a rotor, and wherein the starting system comprises a Load Commutated Inverter (LCI), and wherein the parameter comprises at least one of: an exhaust temperature, a firing temperature, an ambient condition, rotor speed, rotor acceleration, time, or a physical parameter of the turbomachine, and further, wherein:

the step of determining a target range for a parameter comprises the steps of:
  selecting a first parameter related to the operation of the powerplant machine;
  selecting a second parameter related to the operation of the powerplant machine; and
  utilizing an algorithm, wherein the algorithm comprises a look-up table that receives real-time data on the first parameter to determine a value of the second parameter;
  wherein the value of the second parameter comprises the target range of the parameter.

2. The method of claim 1 further comprising performing steps to determine a starting means adjustment command, wherein the steps comprise:
  receiving data on the target range of the parameter;
  receiving data on a measured value of the parameter;
  generating an error signal comprising a difference between the target range and the measured value; and
  utilizing a starting means adjustment block to generate a starting means adjustment command based on the error signal.

3. The method of claim 2, further comprising performing steps to determine a starting means request, wherein the steps comprise:
  receiving the starting means adjustment;
  receiving a starting means command that is based on a nominal schedule of the starting means; and
  utilizing a junction to combine the starting means adjustment with the starting means command; which creates a starting means request;
  wherein the starting means request adjusts the nominal schedule based on the error signal.

4. A method of actively controlling a Load Commutated Inverter (LCI) during a starting process of the gas turbine, the method comprising:
  determining a target range for a parameter, wherein the parameter is associated with an operation of a gas turbine;
  determining a measured value of the parameter;
  determining a parameter difference, wherein the parameter difference is a difference between the target range and the measured value; and
  adjusting an operating schedule of the LCI based on the parameter difference;
wherein the method continuously adjusts an output of the LCI based on the parameter difference during a start-up process of the gas turbine; and wherein the output contributes to the acceleration of the gas turbine, and wherein the gas turbine comprises a rotor, wherein the parameter comprises at least one of: an exhaust temperature, a firing temperature, an ambient condition, rotor speed, rotor acceleration, a desired start-up time, or a physical parameter of the gas turbine, and further wherein the step of determining a target range for a parameter, comprising the steps of:
  selecting a first parameter related to the operation of the gas turbine;
  selecting a second parameter related to the operation of the gas turbine; and
  determining a value of the second parameter by utilizing an algorithm, wherein the algorithm comprises a look-up table that receives real-time data on the first parameter;
  wherein the value of the second parameter is an output of the algorithm; and wherein the value of the second parameter comprises the target range of the parameter.

5. The method of claim 4, wherein the first parameter comprises at least one of: an operating time, or a rotor speed.

6. The method of claim 4, wherein the second parameter comprises at least one of: an operating time, or a rotor speed.

7. The method of claim 4, further comprising performing steps to determine a LCI adjustment command, wherein the steps comprise:
  receiving data on the target range of the parameter;
  receiving data on a measured value of the parameter; wherein the data on the measured value is received in real time;
  generating an error signal comprising a difference between the target range and the measured value; and
  utilizing a LCI adjustment block to generate a LCI adjustment command based on the error signal.

8. The method of claim 7, further comprising performing steps of determining a LCI torque request, wherein the steps comprise:
  receiving the LCI adjustment command;
  receiving a LCI torque command that is based on a LCI nominal operating schedule; and
  utilizing an algorithm to combine the LCI adjustment command with the LCI torque command; which creates a LCI torque request;
  wherein the LCI torque request adjusts the LCI nominal operating schedule based on the error signal.

9. A system for actively controlling a Load Commutated Inverter (LCI) during a starting process of the gas turbine, the system comprising:
  a gas turbine integrated with an LCI; and
  a control system configured for performing the steps of:
    determining a target range for a parameter, wherein the parameter is associated with an operation of the gas turbine;
    determining a measured value of the parameter;
    determining a parameter difference, wherein the parameter difference is a difference between the target range and the measured value; and
    adjusting an operating schedule of the LCI based on the parameter difference;
wherein the control system continuously monitors and adjusts an output of the LCI based on the parameter difference; wherein the output contributes to the acceleration of the gas turbine during a start-up process, and wherein the gas turbine comprises a rotor, and wherein the parameter comprises at least one of: an exhaust temperature, a firing temperature, an ambient condition, rotor speed, rotor acceleration, a desired start-up time, or a physical parameter of the gas turbine, and further wherein:
  the step of determining a target range for a parameter, further comprises the steps of:
    selecting a first parameter related to the operation of the gas turbine;
    selecting a second parameter related to the operation of the gas turbine; and
    determining a value of the second parameter by utilizing an algorithm, wherein the algorithm comprises a look-up table that receives real-time data on the first parameter;
    wherein the value of the second parameter is an output of the algorithm; and wherein the value of the second parameter comprises the target range of the parameter.

10. The system of claim 9 wherein the control system further performs the steps of determining a LCI adjustment command, wherein the steps comprise:
  receiving data on the target range of the parameter;

receiving data on a measured value of the parameter;
wherein the data on the measured value is received in real time.

generating an error signal comprising a difference between the target range and the measured value; and utilizing a LCI adjustment block to generate a LCI adjustment command based on the error signal.

11. The system of claim 10, wherein the control system further performs the steps of determining a LCI torque request, wherein the steps comprise:

receiving the LCI adjustment command;

receiving a LCI torque command that is based on a LCI nominal operating schedule; and utilizing an algorithm to combine the LCI adjustment with the LCI torque command; which creates a LCI torque request;

wherein the LCI torque request adjusts the LCI nominal operating schedule based on the error signal.

* * * * *